United States Patent [19]

Lee

[11] E Patent Number: Re. 31,810

[45] Reissued Date of Patent: Jan. 22, 1985

[54] AGRICULTURAL BAG LOADING APPARATUS BRAKING MECHANISM

[75] Inventor: Richard H. Lee, Astoria, Oreg.

[73] Assignee: Ag-Bag Corporation, Astoria, Oreg.

[21] Appl. No.: 449,151

[22] Filed: Dec. 13, 1982

Related U.S. Patent Documents

Reissue of:

[64] Patent No.: 4,308,901
Issued: Jan. 5, 1982
Appl. No.: 115,440
Filed: Jan. 25, 1980

[51] Int. Cl.[3] ..... B65B 1/04

[52] U.S. Cl. ..... 141/114; 56/16.6; 100/65; 100/100; 100/177; 188/65.1; 254/391

[58] Field of Search ..... 56/344, 16.6; 100/65, 100/100, 144, 177, 188 R, 189, 229 A; 141/10, 73, 80, 95, 114, 313-317, 392; 254/379, 391; 188/65.1, 64

[56] References Cited

U.S. PATENT DOCUMENTS

| | | | |
|---|---|---|---|
| 2,582,672 | 1/1952 | Bobst | 100/23 |
| 2,628,554 | 2/1953 | Philips | 100/100 |
| 3,504,891 | 4/1970 | Ubing | 254/379 |
| 3,687,061 | 8/1972 | Eggenmuller et al. | 141/114 |
| 4,046,068 | 9/1977 | Eggenmuller et al. | 141/114 |
| 4,093,034 | 6/1978 | Curley et al. | 254/379 |
| 4,337,805 | 7/1982 | Johnson et al. | 141/114 |

FOREIGN PATENT DOCUMENTS

| | | | |
|---|---|---|---|
| 282470 | 6/1970 | Australia . | |
| 934252 | 10/1955 | Fed. Rep. of Germany | 254/391 |
| 7040756 | 2/1971 | Fed. Rep. of Germany . | |
| 2005218 | 8/1971 | Fed. Rep. of Germany . | |
| 7143968 | 7/1972 | Fed. Rep. of Germany . | |
| 1183340 | 3/1970 | United Kingdom . | |
| 1185497 | 3/1970 | United Kingdom . | |

OTHER PUBLICATIONS

Silopresse 401: Spare Parts List, 1975.

Photographs of an Eberhardt Silopresse Bag Loading Machine, 1975.

*Primary Examiner*—Houston S. Bell, Jr.

*Attorney, Agent, or Firm*—Michael A. O'Neil

[57] ABSTRACT

An improved brake mechanism is disclosed for use on an agricultural bag loading apparatus (10) having a pair of cable drums (20, 21) secured to the loading apparatus for deploying cables (18, 19) attached to the filled end of an agricultural bag (12). The brake mechanism comprises a disc brake rotor (23) rigidly secured to one end of a brake drum (20), a plurality of disc brake calipers (25) secured to the loading apparatus (10) and a hydraulic fluid pressurizer (29). Braking action between the rotor (23) and the calipers (25) permits control of the compression of the material packed within the agricultural bag (12).

18 Claims, 3 Drawing Figures

AGRICULTURAL BAG LOADING APPARATUS BRAKING MECHANISM

Matter enclosed in heavy brackets [ ] appears in the original patent but forms no part of this reissue specification; matter printed in italics indicates the additions made by reissue.

TECHNICAL FIELD

The present invention relates to an improved braking mechanism for an agricultural bag loading apparatus for loading silage and the like into agricultural bags.

BACKGROUND ART

It is known to store agricultural products such as silage and the like in the field in large plastic bags referred to as agricultural bags. Such bags are generally designed to be filled from one end and may have a diameter in excess of 10 feet and a length of up to 100 feet or more.

Machines have been developed to load silage and other agricultural products into such agricultural bags. A known conventional agricultural bag loading apparatus includes a housing with a rotating shaft mounted therein. The shaft has a plurality of teeth extending outwardly therefrom which are arranged in a generally even, albeit random pattern over the surface of the shaft. As the shaft rotates, the teeth force silage into an agricultural bag which has been secured adjacent to the loading apparatus. As silage is loaded into the bag, the loading apparatus is moved away from the filled end of the bag in a controlled manner by use of a braking mechanism.

It is known to move the loading apparatus away from the filled end of the bag in a controlled manner by securing the filled end of the bag to the loading apparatus with a cable played out in response to the forces created by the compressed silage. Generally, two cables are employed, each disposed on one side of the agricultural bag. Each cable is then wrapped around separate [cabl] *cable* drums in a single layer to avoid excessive wear of the cable. Each drum is rotatably mounted on the corresponding side of the loading apparatus. The two cable drums are rigidly connected by means of a connecting shaft running transversely through the loading apparatus so that rotation of the two drums is identical. It is known to secure a toothed gear to one end of this connecting shaft and secure a tensioned chain about the outer perimeter of this gear. This tension chain also is secured about the outer perimeter of a second, smaller diameter toothed gear which is mounted on a braking device. Typically, this braking device comprises a common automotive type disc brake, with a caliper and rotor, and a hand operated hydraulic pump with pressure measuring devices to monitor the resistance to rotation between the calipers and rotor.

Although known agricultural bag loading apparatus braking mechanisms of this type have performed adequately, several difficulties have been encountered in operation and maintenance. The connecting shaft has occasionally sheared between the connecting shaft gear and the immediately adjacent cable drum. That particular portion of the connecting shaft must resist the torque of both cable drums, and is subject to a bending moment caused by the tension within the chain.

SUMMARY OF THE INVENTION

The foregoing and other problems associated with conventional braking mechanisms on agricultural bag loading machines are solved by means of the present invention. The present invention eliminates the need for gears and an interconnecting chain in the brake mechanism.

In accordance with the present invention, a truck type disc brake rotor is welded to one end of a cable drum. The rotor not only acts to confine the cable on the drum, but in addition interacts with two calipers mounted on the frame of the loading apparatus. The interaction of these calipers and the rotor provides resistance to rotation of the drum deploying the cable. Rotation of the drum on the opposite side of the loading apparatus is similarly resisted as the connecting shaft rigidly interconnects the two drums.

In accordance with the present invention, the torque induced in the connecting shaft is reduced, with only the torque induced by one of the cable drums remaining. The application of forces resisting rotation of the cable drum on a rotor mounted at the end of said cable drum in accordance with the present invention also eliminates any stresses in the connecting shaft present in the known method as a result of the tension in an interconnecting chain.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
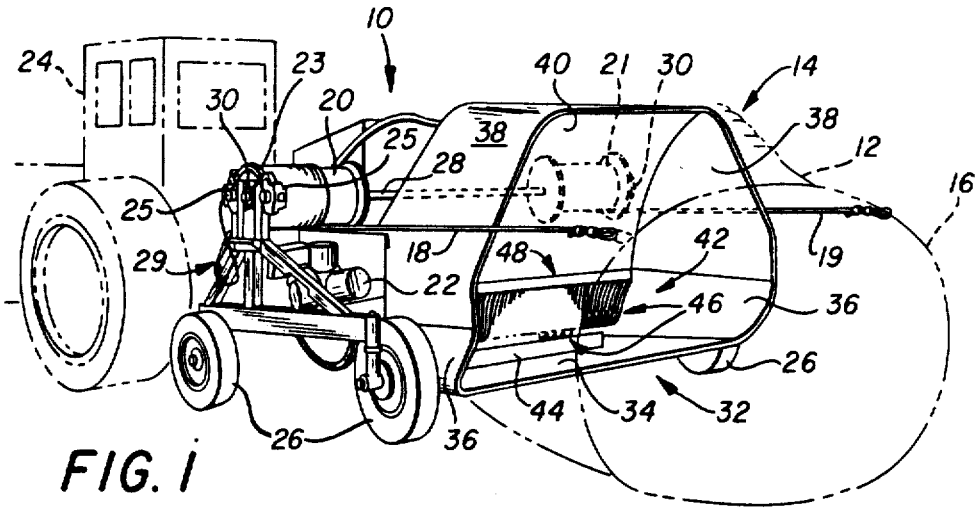
FIG. 1 is a perspective view of the agricultural bag loading apparatus showing the braking mechanism thereof, as well as the output chamber and a partially filled agricultural bag secured thereto.

Referring now to the drawings in which like reference characters designate like or corresponding parts throughout the several views, there is shown in FIG. 1 a perspective view of an agricultural bag loading apparatus 10 embodying the present invention. An agricultural bag 12, shown in phantom lines, is mounted on the loading apparatus 10 and partially filled with silage. The agricultural bag 12 is gathered near the bag mouth 14 in an accordian like fashion. As silage is fed into the agricultural bag 12, the loading apparatus 10 moves away from the filled end of the bag and the gathered portion of the bag expands to allow the bag to be filled.

A backstop 16, also shown in phantom lines, is positioned at the filled end of the agricultural bag 12. The backstop 16 is made of a suitable flexible material such as netting and conforms to the shape of the end of the agricultural bag 12. Cable 18 extends between the backstop 16 and rotatable cable drum 20 on one side of the agricultural bag 12. Similarly, a second cable 19 extends between the backstop 16 and rotatable cable drum 21, shown in phantom lines, on the opposite side of agricultural bag 12. Drums 20 and 21 are mounted at the ends of connecting shaft 28, thereby ensuring joint rotation of both drums. As silage is forced into the agricultural bag 12 by means described hereinafter, the tension in cables 18 and 19 is increased. The rotation of the drums 20 and 21 and deployment of cables 18 and 19 from drums 20 and 21 are resisted by the brake mechanism forming the inventive concept of the present disclosure. Thus, the motion of the loading apparatus away from the filled end of the bag is yieldably resisted by the brake mechanism. The tension on the cables 18 and 19 is applied uniformly and evenly against the filled end of the agricultural bag 12 by the backstop 16. In this manner, the silage within the agricultural bag 12 is compressed at a pressure corresponding to the braking force induced by the brake mechanism.

Figure 2:
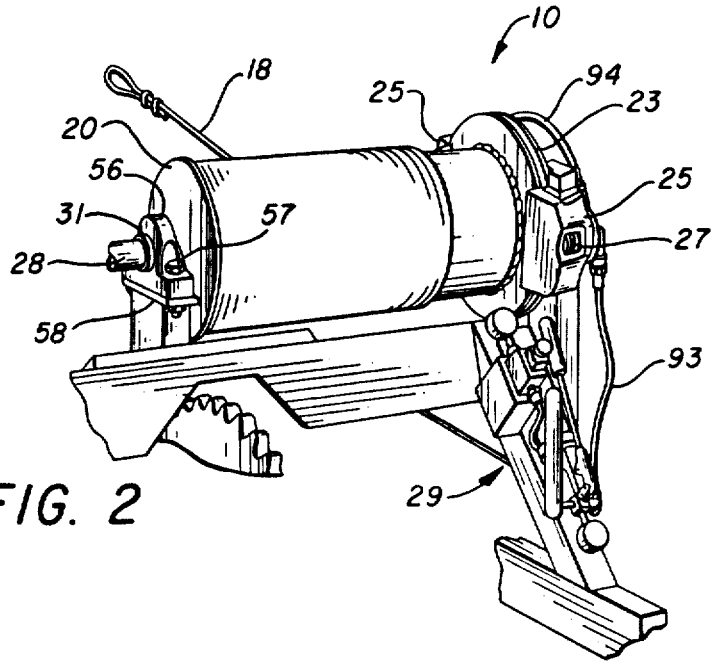
FIG. 2 is a perspective view of the cable drum and braking mechanism as viewed generally from the intake chamber of the loading apparatus toward the output chamber.

The brake mechanism of the present invention comprises a disc brake rotor 23, a pair of brake calipers 25 and a hydraulic fluid pressurizer 29. Rotor 23, of a type commonly employed with a disc brake system of an automobile or truck, is welded to one end of cable drum 20. Dual calipers 25 are rigidly mounted to the frame of the loading apparatus 10 and are positioned such that, upon the application of hydraulic pressure to each caliper 25, the pistons 27, located within the calipers as shown in FIG. 2, are urged into contact with the outer surface of the rotor 23 to resist relative motion therebetween. The hydraulic pressure for this process is provided by hydraulic fluid pressurizer 29, which may be of any common type, but is preferably a hand operated pump 112 as shown in FIG. 3.

Conventional means are used to secure the loading apparatus 10 to the tractor 24 for towing the loading apparatus 10 from place to place. As the agricultural bag 12 is filled with silage, the loading apparatus 10 is inched forward so that the bottom of the bag 12 remains stationary with respect to the ground. In some applications, it may be preferred to allow the loading apparatus 10 to remain stationary with respect to the ground while silage is loaded into the agricultural bag 12. In this latter case, the bottom of the agricultural bag 12 will be forced to slide along the ground or other support surface as it is filled. The loading apparatus 10 is mounted on four wheels 26 that may rotate through an angle of 90°. Thus, the loading apparatus 10 may be moved laterally for transport as well as forwardly and rearwardly for positioning and use.

The agricultural bag 12 and the backstop 16 are shown in phantom in FIG. 1 so that the output chamber 32 may be seen. The lower portion of output chamber 32 is defined by a horizontal bottom 34 with two side walls 36 extending upwardly therefrom. The upper portion of the output chamber 32 is defined by two inclined side wall sections 38 and a back wall 40 which abuts the side wall sections 38 and is inclined rearwardly from its base to its apex.

Figure 3:
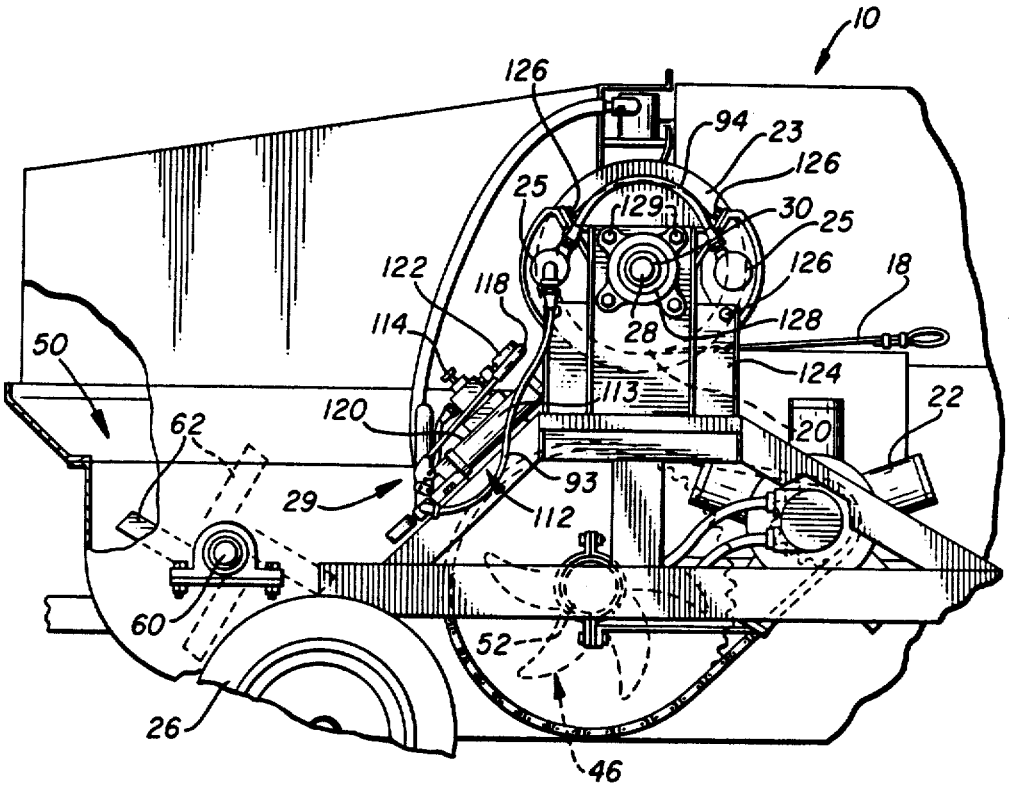
FIG. 3 is a view of the brake mechanism, [coke] *cable* drum and hydraulic brake actuation mechanism as viewed from the side of the loading apparatus.

Silage is forced into the output chamber 32 by means of teeth 46 rigidly attached to a primary shaft 52 as shown in FIG. 3, through a passageway 42. An inclined shield 44 is mounted on the bottom surface 34 in the center of the passageway 42. Gaps are left on either side of the shield 44 and the side walls 36 so that silage is more easily forced through the passageway 42 along the sides of the output chamber 32 than in the center of the chamber 32. As the teeth 46 pass out of the output chamber 32, a comb 48 strips silage from the teeth 46, retaining the silage in the output chamber. A hydraulic motor 22 rotates primary shaft 52 and teeth 46. The power for motor 22 is provided from a hydraulic pump driven by tractor 24.

Referring now to FIG. 2, greater detail of cable drum 20, rotor 23 and calipers 25 may be seen. Cable drum 20 is securely attached near one end of connecting shaft 28. As shown in phantom lines in FIG. 1, cable drum 21 is rigidly secured near the opposite end of connecting shaft 28. End bearings 30, located at both ends of connecting shaft 28, serve to mount connecting shaft 28 on loading apparatus 10 for rotation about a horizontal axis transverse to the length of the apparatus 10. An additional bearing 31 is provided for connecting shaft 28 immediately adjacent to the inner end of cable drum 20. Bearing 31 is mounted within pillow block 56, which is bolted by means of bolts 57 to bearing block 58 forming a portion of the frame of loading apparatus 10.

Brake rotor 23 is welded to drum 20 at the periphery of the outer end of cable drum 20 as shown. The rotor thereby not only functions as a portion of the brake mechanism, but in addition, acts to confine cable 18 on the drum 20. Rotor 23 may be of the type commonly employed on automobiles or trucks. It may be constructed of a solid piece of material, or have cooling fins formed therein.

Dual calipers 25 are rigidly mounted to the frame of loading apparatus 10, and are so situated as to interact in a braking relationship with rotor 23. There are shown two calipers, however it is clear that the present disclosure could include a single caliper, or three or more calipers suitably positioned about the rotor. It is also clear that the caliper may contain one, two or more pistons 27 therein for interaction with the outer surface of rotor 23. Hydraulic line 93 supplies hydraulic fluid at high pressure from hydraulic fluid pressurizer 29 to one of the calipers 23. Hydraulic line 94 interconnects the two calipers to transmit hydraulic pressure to the remote caliper.

Several loops of cable 18 are shown wrapped around cable drum 20. Both cables 18 and 19 are typically wrapped around drums 20 and 21 in a single layer to avoid excessive wear of the cable.

The advantages of the present invention are clearly apparent in FIG. 2. The tension on cable 18 induced by filling the agricultural bag 12 induces a torque moment in cable drum 20. In the prior known art, the torque in drum 20 was then transmitted into connecting shaft 28, then to a brake mechanism. The present invention relieves connecting shaft 28 of the necessity to absorb this torque, and instead directly transmits it to the braking mechanism, a portion of which is actually secured to cable drum 20.

Referring now to FIG. 3, a side view of loading apparatus 10 is shown looking in a horizontal direction parallel to the axis of rotation of connecting shaft 28 and transverse to the direction of relative motion between the loading apparatus 10 and agricultural bag 12 during operation. Frame member 124 is clearly shown, forming the attachment point for calipers 25 and the end bearing 30 of connecting shaft 28. Calipers 25 are mounted with bolts 126. End bearing 30 is mounted in bearing holder 128 secured to frame member 124 by four bolts 129. A portion of cable 18 is shown extended from the surface of cable drum 20 shown in phantom line.

During operation, silage is placed in intake chamber 50. Feeder projection 62 mounted on a feeder shaft 60 are used to precompress the silage to a slight degree and ensure that an adequate supply of silage is always presented to teeth 46. Feeder shaft 60 is also rotated by means of hydraulic motor 22 and rotates on an axis parallel to the axis of rotation of primary shaft 52.

Hydraulic line 93 is shown connected to a hydraulic fluid pressurizer 29. In the present embodiment pressurizer 29 comprises a hand pump 112, a hydraulic reservoir 113 and a hand operated pressure relief valve 114. It will be understood, however, that any other source of hydraulic pressure sufficient to operate the brake mechanism of the present invention is encompassed by this disclosure.

The cylinder 120 of hand pump 112 is rigidly secured to the frame of loading apparatus 10. The operator of loading apparatus 10 may pressurize the system to the desired pressure by oscillating hand pump handle 118 and observing pressure gauge 122. The braking force of the brake mechanism is proportional to the pressure created in pump 112. By varying this pressure the resistance to rotation of cable drums 20 and 21, deploying cables 18 and 19, may be varied, and the degree of compression of the silage within the agricultural bag 12 may be adjusted.

It is clear from FIG. 3 that the present invention has great advantages over that known in the art. By eliminating the need for a chain and a gear set between the brake device and connecting shaft 28, stress induced in the connecting shaft 28 by the necessary chain tension is eliminated.

Although particular embodiments of the invention have been described in the accompanying drawings and described in the foregoing detailed description, it will be understood that the invention is not limited to the embodiments disclosed, but is capable of numerous rearrangements, modifications and substitutions of parts and elements without departing from the spirit of the invention.

I claim:

1. An improved brake mechanism for deploying the attachment means between the filled end of an agricultural bag and an agricultural bag loading apparatus in response to the loading of material into said agricultural bag, said improvement comprising:

drum means rotatably mounted on said loading apparatus, said drum means deploying the attachment means upon rotation of said drum means in one direction;

a disc brake rotor means forming one end of said drum means;

disc brake caliper means attached to said loading apparatus; and actuation means causing said disc brake caliper means to resist motion between said disc brake caliper means and said disc brake rotor means.

2. The improved brake mechanism of claim 1 wherein said attachment means comprises a flexible cable.

3. The improved brake mechanism of claim 1 wherein said actuation means comprises pressurized fluid.

4. The actuation means of claim 3 further comprising a manually operated hydraulic pump for supplying said pressurized fluid.

5. The actuation means of claim 3 further comprising a pressure sensor and dial for indicating the fluid pressure and a pressure relief valve manually operated for releasing the fluid pressure.

6. An improved brake mechanism for deploying the attachment means between the filled end of an agricultural bag and an agricultural bag loading apparatus in response to the loading of material into said agricultural bag, said improvement comprising:

a plurality of drum means rotatably mounted on said loading apparatus and having said attachment means secured thereto, said drum means deploying said attachment means and lengthening the separation between the filled end of said agricultural bag and said loading apparatus upon rotation of said drum means in one direction, said drum means storing excess attachment means;

a disc brake rotor forming one end of at least one of said drum means;

a plurality of disc brake calipers attached to said loading apparatus, said calipers surrounding said disc brake rotor so that the pistons within said calipers will bear against said disc brake rotor to resist motion between said calipers and said disc brake rotor; and a variable pressure fluid pressurizer for pressurizing a fluid within said calipers and urging said pistons into contact with said disc brake rotor.

7. The improved brake mechanism of claim 6 wherein said attachment means comprises a flexible cable.

8. The improved brake mechanism of claim 6 wherein said variable pressure fluid pressurizer comprises a manually operated hydraulic pump.

9. The improved brake mechanism of claim 6 further comprising a pressure sensor and dial for indicating the pressure of the fluid within said brake mechanism.

10. The improved brake mechanism of claim 6 further comprising a pressure relief valve manually operated for releasing the fluid pressure within said brake mechanism.

11. An improved brake mechanism for an agricultural bag loading apparatus for loading silage and the like into an agricultural bag, said loading apparatus including an intake for receiving silage, an output for discharging silage into an agricultural bag, and a silage moving device for forcing silage from the intake into the output and into the agricultural bag, said brake mechanism maintaining a desired tension in a cable means connecting the filled end of said agricultural bag and said loading apparatus during the filling operation, said improvement comprising:

a plurality of cable drum means mounted for rotation on a common connecting shaft means on said loading apparatus, said drum means having said cable means secured thereto and deploying said cable means and lengthening the separation between the filled end of said agricultural bag and said loading apparatus upon rotation of said drum means in one direction, said drum means storing excess cable means during operation of said loading apparatus;

a disc brake rotor secured to one end of one of said cable drum means, said rotor forming a raised edge formed radially outwardly from the outer surface of said drum [mean] *means*, said edge containing said cable means on said drum means;

a plurality of disc brake calipers rigidly mounted on said loading apparatus and having a plurality of pistons moveably mounted in the body of said calipers, said pistons being situated for urging against the outer surface of said disc brake rotor to resist relative rotation between said calipers and said rotor; and a variable pressure fluid pressurizer urging said pistons into contact with said rotor.

12. The improved brake mechanism of claim 11 wherein said plurality of cable drum means comprises two cable drums mounted on opposite ends of said connecting shaft means.

13. The improved brake mechanism of claim 11 wherein said variable pressure fluid pressurizer is a manually operated fluid pump.

14. The improved brake mechanism of claim 11 further comprising a pressure sensor and dial for indicating the fluid pressure in said brake mechanism and further indicating the degree of compression of the material within the agricultural bag.

15. The improved brake mechanism of claim 11 further comprising a manually operated relief valve to relieve the fluid pressure in said brake mechanism.

*16. An improved brake mechanism for deploying an attachment means between the filled end of an agricultural bag and an agricultural bag loading apparatus in response to the loading of material into said agricultural bag, said improvement comprising:*

*drum means rotatably mounted on said loading apparatus, said drum means deploying the attachment means upon rotation of said drum means in one direction, wherein said attachment means includes a cable wrapped around said drum means in a single layer to prevent excessive wear of said cable;*

*a first brake portion forming one end of said drum means;*

*a second brake portion attached to said loading apparatus; and*

*actuation means causing said second brake portion to resist motion between said second brake portion and said first brake portion.*

*17. An improved brake mechanism for deploying a cable between the filled end of an agricultural bag and an agricultural bag loading apparatus in response to the loading of material into said agricultural bag, said improvement comprising:*

*a cable drum rotatably mounted on said loading apparatus, said cable drum deploying said cable upon rotation of said cable drum in one direction, wherein said cable is wrapped around said drum in a single layer to prevent excessive wear of said cable;*

*a first brake portion forming one end of said cable drum;*

*a second brake portion attached to said loading apparatus; and*

*actuation means for causing said first and second brake portions to resist rotation of said cable drum.*

*18. An improved brake mechanism for resisting movement of the filled end of an agricultural bag away from an agricultural bag loading apparatus in response to the loading of material into said agricultural bag from the agricultural bag loading apparatus to compress the material, the agricultural bag loading apparatus having a connecting shaft rotatably mounted thereon the first and second cable drums rigidly mounted on the connecting shaft for joint rotation with the connecting shaft proximate opposite ends of the connecting shaft, each of the first and second cable drums playing out a flexible cable attached to the filled end of the agricultural bag, said improvement comprising:*

*a first brake portion secured to the first cable drum; and*

*a second brake portion secured to the agricultural loading apparatus, said first and second brake portions being activatable to resist rotation of the first and second cable drums to tension the flexible cables, the connecting shaft being required to transfer only torque sufficient to resist rotational motion of the second cable drum, wherein the flexible cables are wrapped around said first and second cable drums in a single layer to prevent excessive wear of the cables.*

* * * * *